United States Patent [19]

(12) United States Patent
Bi et al.

(10) Patent No.: US 10,187,695 B2
(45) Date of Patent: *Jan. 22, 2019

(54) NOTIFICATION OF MEDIA CONTENT OF INTEREST

(71) Applicant: AT&T INTELLECTUAL PROPERTY I, LP., Atlanta, GA (US)

(72) Inventors: Haifeng Bi, San Antonio, TX (US); Xiaolian Bi, San Antonio, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/411,029

(22) Filed: Jan. 20, 2017

(65) Prior Publication Data

US 2017/0134812 A1 May 11, 2017

Related U.S. Application Data

(63) Continuation of application No. 13/484,596, filed on May 31, 2012, now Pat. No. 9,560,305.

(51) Int. Cl.
*H04N 21/472* (2011.01)
*H04N 5/445* (2011.01)
(Continued)

(52) U.S. Cl.
CPC ... *H04N 21/47214* (2013.01); *H04N 5/44543* (2013.01); *H04N 21/25883* (2013.01);
(Continued)

(58) Field of Classification Search
CPC ............. H04N 21/232; H04N 21/4828; H04N 21/482; H04N 21/47214; H04N 21/4334; H04N 21/4882
See application file for complete search history.

(56) References Cited

U.S. PATENT DOCUMENTS 5,574,662 A 11/1996 Windrem et al.
5,640,484 A 6/1997 Mankovitz
(Continued)

OTHER PUBLICATIONS

TiVo Series 3 User Manual; TiVo® service running on the TiVo® brand Series3TM HD Digital Media Recorder, © 2006 TiVo Inc., 146 pages.
(Continued)

*Primary Examiner* — Robert J Hance
(74) *Attorney, Agent, or Firm* — Toler Law Group, PC

(57) ABSTRACT

A method includes receiving search criteria associated with a user account, sending a first query identifying a first media content item from the server to a device associated with the user account in response to identifying the first media content item that satisfies the search criteria and that is scheduled to be available to a media device associated with the user account and distinct from the device, and sending a second query that identifies a second media content item that satisfies the search criteria from the server to the device in response to lapse of a time period and a determination that a first title associated with the first media content item matches a second title associated with the second media content item and that a first time associated with the first media content item does not match a second time associated with the second media content item.

20 Claims, 6 Drawing Sheets

(51) Int. Cl.
  *H04N 21/84* (2011.01)
  *H04N 21/482* (2011.01)
  *H04N 21/433* (2011.01)
  *H04N 21/258* (2011.01)
  *H04N 21/262* (2011.01)
  *H04N 21/45* (2011.01)
  *H04N 21/458* (2011.01)
  *H04N 21/488* (2011.01)

(52) U.S. Cl.
  CPC . *H04N 21/25891* (2013.01); *H04N 21/26283* (2013.01); *H04N 21/4334* (2013.01); *H04N 21/458* (2013.01); *H04N 21/4532* (2013.01); *H04N 21/482* (2013.01); *H04N 21/4821* (2013.01); *H04N 21/4826* (2013.01); *H04N 21/4828* (2013.01); *H04N 21/4882* (2013.01); *H04N 21/84* (2013.01)

(56) References Cited

U.S. PATENT DOCUMENTS

| | | | |
|---|---|---|---|
| 5,724,475 A | 3/1998 | Kirsten | |
| 6,654,749 B1* | 11/2003 | Nashed | G06F 17/30864 707/706 |
| 6,725,461 B1 | 4/2004 | Dougherty et al. | |
| 6,901,603 B2 | 5/2005 | Zeidler | |
| 6,968,364 B1 | 11/2005 | Wong et al. | |
| 7,095,402 B2 | 8/2006 | Kunii et al. | |
| 7,237,250 B2 | 6/2007 | Kanojia et al. | |
| 7,694,319 B1* | 4/2010 | Hassell | H04N 5/44543 725/136 |
| 7,817,995 B2 | 10/2010 | Khurana et al. | |
| 8,079,048 B2 | 12/2011 | Howcroft | |
| 8,700,643 B1* | 4/2014 | Gossweiler, III | G06F 17/30038 707/754 |
| 2002/0016965 A1 | 2/2002 | Tomsen | |
| 2002/0032907 A1 | 3/2002 | Daniels | |
| 2002/0092022 A1 | 7/2002 | Dudkicwicz et al. | |
| 2002/0157099 A1 | 10/2002 | Schrader et al. | |
| 2002/0166123 A1 | 11/2002 | Schrader et al. | |
| 2003/0012554 A1 | 1/2003 | Zeidler et al. | |
| 2003/0046698 A1 | 3/2003 | Kamen et al. | |
| 2003/0131354 A1 | 7/2003 | Lanser | |
| 2003/0159150 A1 | 8/2003 | Chernock et al. | |
| 2004/0040035 A1 | 2/2004 | Carlucci et al. | |
| 2004/0078816 A1* | 4/2004 | Johnson | H04N 5/44543 725/52 |
| 2004/0093616 A1* | 5/2004 | Johnson | H04N 5/44543 725/53 |
| 2004/0103434 A1 | 5/2004 | Ellis | |
| 2004/0146271 A1 | 7/2004 | Burks | |
| 2004/0260749 A1 | 12/2004 | Trossen et al. | |
| 2005/0055715 A1 | 3/2005 | Minnick et al. | |
| 2005/0055717 A1 | 3/2005 | Daniels | |
| 2005/0055730 A1 | 3/2005 | Daniels | |
| 2005/0060755 A1 | 3/2005 | Daniels | |
| 2005/0060756 A1 | 3/2005 | Daniels | |
| 2005/0086696 A1 | 4/2005 | Daniels | |
| 2005/0193415 A1 | 9/2005 | Ikeda | |
| 2005/0196139 A1 | 9/2005 | Blackketter et al. | |
| 2005/0204388 A1* | 9/2005 | Knudson | H04N 5/44543 725/58 |
| 2005/0232592 A1 | 10/2005 | Kimoto et al. | |
| 2005/0251750 A1 | 11/2005 | Vallone et al. | |
| 2005/0267994 A1 | 12/2005 | Wong et al. | |
| 2006/0031880 A1 | 2/2006 | Stark et al. | |
| 2006/0090179 A1 | 4/2006 | Hsu et al. | |
| 2006/0136966 A1 | 6/2006 | Folk, II | |
| 2006/0174270 A1* | 8/2006 | Westberg | H04N 5/44543 725/39 |
| 2006/0212906 A1 | 9/2006 | Cantalini | |
| 2007/0078898 A1 | 4/2007 | Hayashi et al. | |
| 2007/0087833 A1 | 4/2007 | Feeney et al. | |
| 2007/0107016 A1 | 5/2007 | Angel et al. | |
| 2007/0162341 A1 | 7/2007 | McConnell et al. | |
| 2007/0168228 A1 | 7/2007 | Lawless | |
| 2007/0168539 A1 | 7/2007 | Day | |
| 2007/0188902 A1 | 8/2007 | Patron et al. | |
| 2007/0212023 A1 | 9/2007 | Whillock | |
| 2008/0148320 A1 | 6/2008 | Howcroft | |
| 2008/0163305 A1 | 7/2008 | Johnson | |
| 2008/0172689 A1 | 7/2008 | Feder et al. | |
| 2008/0184313 A1 | 7/2008 | Knudson et al. | |
| 2008/0258042 A1 | 10/2008 | Whitman | |
| 2009/0150379 A1* | 6/2009 | Park | G06F 17/30038 |
| 2009/0293081 A1* | 11/2009 | Pirani | H04N 7/17318 725/25 |
| 2009/0300695 A1 | 12/2009 | White et al. | |
| 2010/0107194 A1* | 4/2010 | McKissick | H04N 5/44513 725/40 |
| 2010/0131988 A1 | 5/2010 | Kent et al. | |
| 2010/0138860 A1 | 6/2010 | Goodwin et al. | |
| 2010/0199219 A1 | 8/2010 | Poniatowski et al. | |
| 2011/0099582 A1 | 4/2011 | Howcroft et al. | |
| 2011/0154408 A1* | 6/2011 | Svensson | H04N 21/4882 725/58 |

OTHER PUBLICATIONS

"TitanTV for Mobile Devices," TitanTV, <http:www.titantv.com/mobileinfo.aspx>, retrieved Mar. 20, 2012., 1 page.
"TitanTV Help Topics," TitanTV, retrieved from <http://www.titantv.com/help.aspx>, retrieved Mar. 20, 2012, 12 pages.
"TitanTV.com Usage Tips," TitanTV, retrieved from <http.www.titantv.com/tips.aspx>, retrieved Mar. 20, 2012, 2 pages.
"Virgin Tivo Box," digiguide.tv, retrieved from <http://forums.digiguide.tv/topic.asp?id=35835&subject=Virgin+Tivo+Box>, retrieved Mar. 20, 2012, 4 pages.

* cited by examiner

NOTIFICATION OF MEDIA CONTENT OF INTEREST

CLAIM OF PRIORITY

The present application claims priority from, and is a continuation application of, U.S. patent application Ser. No. 13/484,596, filed May 31, 2012, which is hereby incorporated by reference in its entirety.

FIELD OF THE DISCLOSURE

The present disclosure is generally related to media content notifications.

BACKGROUND

An electronic program guide (EPG) may provide information regarding scheduled media content (e.g., television shows) to media service users, such as television service users. The EPG typically informs the media service users about the time and date of scheduled media content on available channels.

A media service provider may distribute the EPG to the users on a special (e.g., dedicated) EPG channel. The users may access the special EPG channel to identify scheduled media content of interest. However, if a user does not check the special EPG channel, he or she may not be aware of an upcoming showing of media content of interest.

DETAILED DESCRIPTION

Figure 1:
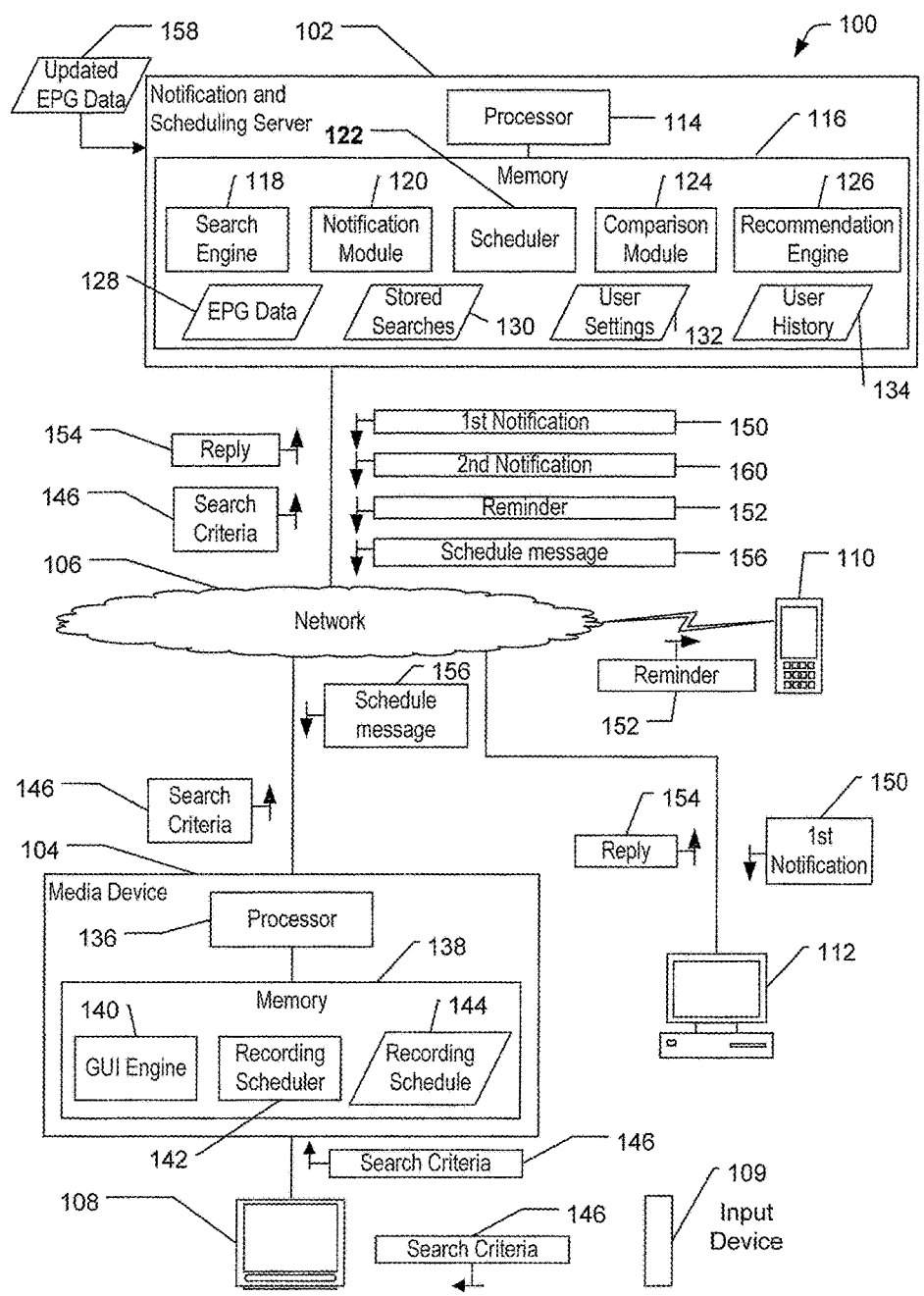
FIG. 1 is a diagram to illustrate a particular embodiment of a system operable to notify a user of upcoming media content of interest.

A media service user may miss upcoming scheduled media content of interest because the user does not know about scheduled showing(s). For example, a user may not be able to check an electronic program guide (EPG) in a timely manner due to a busy work schedule. By the time the user has a chance to check the EPG, the media content of interest may have already aired. Systems and methods described herein may enable a user to search for and be notified of upcoming media content of interest prior to such media content airing.

For example, a user may search for media content of interest via an on-screen user configuration menu. The user configuration menu may be provided by a media service provider as a software enhancement to the user's set-top box (STB). The user may specify different search criteria for a device in a network (e.g., a server) to search the EPG for media content of interest. The search criteria may include a media content title (e.g., "Forrest Gump"), keywords (e.g., "Tom Hanks"), a category (e.g., "comedy"), a channel name (e.g., "ABC"), other information descriptive of particular content, or a combination thereof. The user may also specify the number of days in the future that the EPG is to be searched. For example, the user may specify for the device to search within the next seven days for any match to the search criteria. When there is a match, the user may be automatically notified. However, the user may not be notified of the same match repeatedly.

In a particular embodiment, a method includes receiving search criteria from a media device associated with a user account. The method also includes performing a first search of media content information. The media content information is descriptive of media content that is accessible and scheduled to be available to the media device based on the user account when the first search is performed. The method further includes, in response to identifying particular media content that satisfies the search criteria, sending a first notification identifying a first occurrence of the particular media content to a device associated with the user account. The method further includes, at a time indicated by the search criteria, performing a second search of updated media content information. The updated media content information is descriptive of media content that is accessible and scheduled to be available to the media device based on the user account when the second search is performed. The method further includes, in response to the second search identifying a second occurrence of the particular media content, determining whether the second occurrence matches the first occurrence. The method further includes sending a second notification when the second occurrence does not match the first occurrence and refraining from sending the second notification when the second occurrence matches the first occurrence.

In another particular embodiment, a non-transitory computer-readable medium stores processor-executable instructions that, when executed by a processor, cause the processor to receive search criteria from a media device associated with a user account. The instructions, when executed, also cause the processor to perform a first search of media content information. The media content information is descriptive of media content that is accessible and scheduled to be available to the media device based on the user account when the first search is performed. The instructions, when executed, further cause the processor to, in response to identifying particular media content that satisfies the search criteria, send a first notification identifying a first occurrence of the particular media content to a device associated with the user account. The instructions, when executed, cause the processor to, at a time indicated by the search criteria, perform a second search of updated media content information. The updated media content information is descriptive of media content that is accessible and scheduled to be available to the media device based on the user account when the second search is performed. The instructions, when executed, also cause the processor to, in response to the second search, identify a second occurrence of the particular media content and determine whether the second occurrence matches the first occurrence. The instructions, when executed, further cause the processor to send a second notification when the second occurrence does not match the first occurrence and refrain from sending the second notification when the second occurrence matches the first occurrence.

In another particular embodiment, a system includes a processor and a memory accessible to the processor, the memory storing processor-executable instructions that, when executed by the processor, cause the processor to receive search criteria from a media device associated with a user account. The instructions also cause the processor to perform a first search of media content information. The media content information is descriptive of media content that is accessible and scheduled to be available to the media device based on the user account when the first search is performed. The instructions further cause the processor to, in response to identifying particular media content that satisfies the search criteria, send a first notification identifying a first occurrence of the particular media content to a device associated with the user account. The instructions further cause the processor to, at a time indicated by the search criteria, perform a second search of updated media content information. The updated media content information is descriptive of media content that is accessible and scheduled to be available to the media device based on the user account when the second search is performed. The instructions further cause the processor to, in response to the second search identifying a second occurrence of the particular media content, determine whether the second occurrence matches the first occurrence. The instructions further cause the processor to send a second notification when the second occurrence does not match the first occurrence and refrain from sending the second notification when the second occurrence matches the first occurrence.

FIG. 1 is a diagram to illustrate a particular embodiment of a system 100 operable to notify a user of upcoming media content of interest. The system 100 may include a notification and scheduling server 102 communicatively coupled to a media device 104 through a network 106 (e.g., a wide area network, the Internet, a local area network, etc.). The system 100 may be communicatively coupled to a viewing device 108 (e.g., a television, a computer monitor, etc.) connected to the media device 104, a mobile communication device 110 (e.g., a cell phone, a tablet computer, etc.), and a computing device 112 (e.g., a laptop computer, a desktop computer, etc.). The media device 104, the mobile communication device 110, and the computing device 112 may be associated with a user account of the user.

The notification and scheduling server 102 may be a network-accessible computing device, such as a server computer. The notification and scheduling server 102 may include a processor 114 and a memory 116. The processor 114 may be coupled to the memory 116 via an electrical connection. The memory 116 may include a search engine 118, a notification module 120, a scheduler 122, a comparison module 124, and a recommendation engine 126. The memory 116 may also include EPG data 128, stored searches 130, user settings 132, and a user history 134. In a particular embodiment, the search engine 118, the notification module 120, the scheduler 122, the comparison module 124, and the recommendation engine 126 are implemented using processor-executable instructions executable by the processor 114.

The media device 104 may be a set-top box (STB), a digital video recorder (DVR), or any combination thereof. The media device 104 may include a processor 136 and a memory 138. The memory 138 may include a graphical user interface (GUI) engine 140, a recording scheduler 142, and a recording schedule 144. In a particular embodiment, the GUI engine 140 and the recording scheduler 142 are implemented using processor-executable instructions executable by the processor 136.

During operation, when the user elects to search for upcoming media content of interest, the user may enter search criteria 146 related to the upcoming media content of interest via a search configuration display provided by the media device 104. The GUI engine 140 may provide the search configuration display to the user in the form of an interactive GUI. The GUI engine 140 may generate the interactive GUI and the processor 136 may cause the interactive GUI to be presented to the user via the viewing device 108. The search configuration display may also or in the alternative be provided to the user by a communication device (e.g., the mobile communication device 110, the computing device 112, etc.). A particular example of a search configuration display is further described with reference to FIG. 2.

The user may enter various options to specify the search criteria 146 via an input device 109 (e.g., a keyboard, a remote control, etc.) when the search configuration display is provided by the media device 104. Alternatively, the user may enter the various options via an input interface of the communication device (e.g., a touch screen of the mobile communication device 110, a keyboard of the computing device 112, etc.) when the search configuration display is provided by the communication device. The user may specify how the upcoming media content of interest is identified (e.g., by title, by keywords, by category/genre, by channel name, etc.). The user may also specify an indication of a user selected notification type (e.g., via e-mails, short messaging service (SMS) messages, data pushed to a notification application of a smart phone, etc.) in the search criteria 146 when upcoming media content of interest is found. The user may indicate in the search criteria 146 that the upcoming media content of interest is to be recorded (e.g., to a DVR). In addition, the user may specify a search frequency (e.g., how often a search is to be performed) and a search duration (e.g., for how long searches based on the search criteria 146 are to be performed according to the search frequency). The user may provide the search criteria 146 via the input device 109 to the media device 104. Alternatively, the user may provide the search criteria 146 via the input interface of the communication device. The media device 104 may transmit the search criteria 146 via the network 106 to the notification and scheduling server 102 to trigger a search for media content information based on the search criteria 146.

In response to receiving the search criteria 146, the notification and scheduling server 102 may store media content identification information from the search criteria 146 in the stored searches 130 to enable automatic generation of search criteria in the future. The notification and scheduling server 102 may store other information (e.g., an e-mail address to send notifications to) in the user settings 132 as a default communication address. Also, in response to receiving the search criteria 146, the search engine 118 may perform a first search of media content information in the EPG data 128 based the search criteria 146. The EPG data 128 may be updated by updated EPG data 158 that may be downloaded from an external source (not shown) before the first search. The EPG data 128 may include information descriptive of media content that is accessible to the media device 104 (e.g., show times of pay-per-view programs that the user can order) based on the user account when a search is performed. The EPG data 128 may also include information descriptive of the media content that is scheduled to be available to the media device 104 (e.g., show times of media content airing on the user's subscribed channels) based on the user account when the search is performed.

The search engine 118 may determine whether an occurrence of the particular media content is identified based on a search result (e.g., the result of the first search). When the search engine 118 identifies the first occurrence of the particular media content that satisfies the search criteria 146, the notification and scheduling server 102 may send a first notification 150 (e.g., via an e-mail, a text message, etc.) identifying the first occurrence of the particular media content via the notification module 120 to a user device at a communication address (e.g., an e-mail address, a telephone number, etc.) indicated in the search criteria 146 for receiving notifications. In a particular embodiment, the first notification 150 is sent to the computing device 112 as an e-mail. When a communication address is not provided in the search criteria 146, the first notification 150 may be sent to a default communication address associated with the user account. An example of a notification message is further described with reference to FIG. 4.

The first notification 150 may include one or more interface elements that are selectable to cause a computing device (e.g., the media device 104, the mobile communication device 110, the computing device 112, etc.) to schedule performance of one or more actions related to the particular content. The first notification 150 may include a selectable interface element that, when selected, may enable the media device 104 to record the particular media content. The first notification 150 may also include a selectable interface element that when selected requests the notification and scheduling server 102 to send a reminder notification 152 about the particular media content to the mobile communication device 110 or any other devices associated with the user account. In a particular embodiment, the first notification 150 includes a selectable interface element that when selected requests the notification and scheduling server 102 to send the reminder notification 152 to the communication address that receives the first notification 150. In another embodiment, the first notification 150 includes a selectable interface element that when selected requests the notification and scheduling server 102 to send the reminder notification 152 to a communication address different than the communication address that receives the first notification 150.

In response to the first notification 150, the user may generate a reply 154 by selecting one or more interface elements of the first notification 150. The reply 154 may indicate an action (e.g., schedule a recording of the particular media content, schedule a reminder notification, etc.) that is to be performed. The reply 154 may be transmitted to the notification and scheduling server 102 from the mobile communication device 110. The notification and scheduling server 102 may determine whether the reply 154 is received.

When the notification and scheduling server 102 receives the reply 154, the scheduler 122 may process the reply 154 to schedule performance of the one or more actions indicated by the reply 154. In a particular embodiment, the scheduler 122 sends a schedule message 156 to the media device 104 to schedule a recording of the particular media content based on the reply 154 at the media device 104 or the schedule message 156 may be sent to a networked DVR. The recording scheduler 142 may receive the schedule message 156 and may update the recording schedule 144 to include the particular media content. The media device 104 may record the particular media content based on the recording schedule 144. In another embodiment, the scheduler 122 instructs the notification module 120 to send the reminder notification 152 at a time indicated in the reply 154 to a communication address. The communication address may be a communication address of the user device that received the first notification 150. Alternatively, the communication address may be different than the communication address of the user device that received the first notification 150. For example, the first notification 150 may be sent to an e-mail address, but the reminder notification 152 may be directed to a telephone number of the mobile communication device 110 via a SMS message.

When the search engine 118 does not find any particular media content that satisfies the search criteria 146 or when the search engine 118 does not receive the reply 154 after waiting for a defined time period as indicated in the search criteria 146, the search engine 118 may perform another search for updated media content information using the EPG data 128. When the search engine 118 identifies the first occurrence of the particular media content that satisfies the search criteria 146, the notification and scheduling server 102 may then send the first notification 150. During the defined time period, the EPG data 128 may have been updated based on updated EPG data 158.

The search engine 118 may determine whether a second occurrence of the particular media content is identified based on the result of a second search. When the search engine 118 identifies the second occurrence of the particular media content, the comparison module 124 may compare the second occurrence to the first occurrence found during the earlier first search. The comparison module 124 may compare the second occurrence to previous occurrences within the same search and all previous occurrences in previous searches regarding which the user was notified. In a particular embodiment, the comparison module 124 compares a first EPG identifier (e.g., information uniquely distinguishing particular media content from other media content in the EPG) associated with the first occurrence to a second EPG identifier associated with the second occurrence. In another embodiment, the comparison module 124 compares a first date associated with the first occurrence to a second date associated with the second occurrence, a first time associated with the first occurrence to a second time associated with the second occurrence, a first title associated with the first occurrence to a second title associated with the second occurrence, or a combination thereof.

When the comparison module 124 determines that the second occurrence is the same as the first occurrence or the same as another occurrence of which the user was previously notified, the comparison module 124 may instruct the notification module 120 not to send another notification. When the comparison module 124 determines that the second occurrence is different from the first occurrence and different from any other occurrences of which the user was previously notified, the comparison module 124 may instruct the notification module 120 to send a second notification 160. Thus, the user is not repeatedly notified regarding the same particular media content of interest.

For example, the user may specify the search criteria 146 for the search engine 118 to search for basketball games on a daily basis. The EPG data 128 may include time and date information of scheduled media content for the next seven days and may be updated daily. On Monday, the EPG data 128 may include time and date information of scheduled media content from Monday to Sunday. The search engine 118 may perform a first search in the EPG data 128 based on the search criteria 146 and may identify a first occurrence of a basketball game scheduled to be aired on Wednesday at 8 PM. The notification module 120 may notify the user of the first occurrence via the first notification 150 when the first occurrence is identified. On Tuesday, the EPG data 128 may be updated and may include time and date information of scheduled media content from Tuesday to the following Monday. The search engine 118 may perform a second search based on the search criteria 146 and may identify the first occurrence scheduled to be aired on Wednesday at 8 PM and a second occurrence of a basketball game scheduled to be aired on the following Monday at 10 PM. The comparison module 124 may identify that the user has been notified of the first occurrence on Monday and may notify the user of the second occurrence via the second notification 160, but not the first occurrence. The user may not be notified about the first occurrence again in the second notification 160.

In a particular embodiment, the notification and scheduling server 102 presents a recommendation alter option to the user through a user settings display. A particular example of a user settings display is further described with reference to FIG. 3. By opting in (e.g., granting permission) via the recommendation alter option, the user enables the notification and scheduling server 102 to automatically generate search criteria based on the user history 134 (e.g., media content previously viewed by the user) and/or the stored searches 130 (e.g., media content previously searched for by the user) and send notifications to the user. For example, if the user history 134 indicates that the user frequently watches tennis matches and/or the stored searches 130 indicate that the user frequently searches for tennis matches, the recommendation engine 126 may identify such a trend based on the user history 134. The recommendation engine 126 may automatically instruct the search engine 118 to search for upcoming tennis matches, even if tennis matches are not specified in the search criteria 146. When the search engine 118 identifies upcoming tennis matches, the user may be proactively notified of the upcoming tennis matches.

The system 100 may thus enable a user (e.g., a television service subscriber) to be notified of upcoming media content of interest (e.g., show time of a television program) without the user manually checking an EPG to identify the upcoming media content of interest.

Figure 2:
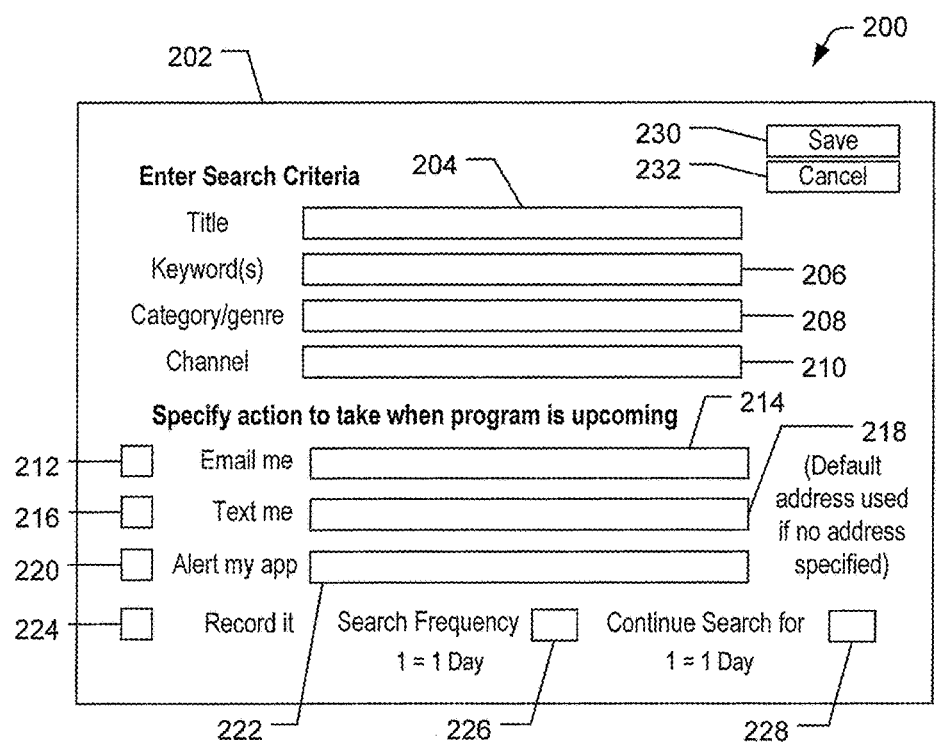
FIG. 2 is a diagram to illustrate a particular example of a search configuration display associated with notifying a user of upcoming media content of interest.

FIG. 2 is a diagram to illustrate a particular example of a search configuration display 202 associated with upcoming media content of interest, and is generally designated 200. In an illustrative embodiment, the search criteria 146 of FIG. 1 may be received via the search configuration display 202.

The media device 104 of FIG. 1 may present the search configuration display 202 to the user. The search configuration display 202 may include a title option 204, a keyword (s) option 206, a category/genre option 208, and a channel option 210. The search configuration display 202 may also include an e-mail notification option 212 and an associated text box 214, a text message notification option 216 and an associated text box 218, an application notification option 220 and an associated text box 222, a record option 224, a search frequency option 226, a search duration option 228, a save option 230, and a cancel option 232. The search configuration display 202 that includes each of the options and the associated text boxes may be provided by the notification and scheduling server 102 of FIG. 1 via the media device 104 of FIG. 1 to the user as selectable interface elements. The search configuration display 202 may also be presented to the user via the communication device 110, the computing device 112, another computing device (e.g., a tablet computer), or a combination thereof.

The title option 204, the keyword(s) option 206, the category/genre option 208, the channel option 210, or a combination thereof, may be grouped together to enable the user to identify the upcoming media content of interest. Additionally, explanation language (e.g., "Enter search criteria") may be placed near the title option 204, the keyword (s) option, the category/genre option 208, the channel option 210, or a combination thereof, to help guide the user. The user may enter information related to a title of the upcoming media content of interest (e.g., "Forrest Gump") in the title option 204. The user may enter keywords (e.g., "Tom Hanks") related to the upcoming media content of interest in the keyword(s) option 206. The user may enter category or genre information related to the upcoming media content of interest (e.g., "comedy") in the category/genre option 208. The user may enter information related to a channel name that may air the upcoming media content of interest (e.g., "ABC") in the channel option 210. The user may enter different information relating to different media content of interest in the title option 204, the keyword(s) option 206, the category/genre option 208, the channel option 210, or a combination thereof, to enable different searches to be performed for each option. The user may enter information related to the same media content of interest in the title option 204, the keyword(s) option 206, the category/genre option 208, the channel option 210, or a combination thereof; to enable a more specific search to be performed.

The e-mail notification option 212, the text message notification option 216, the application notification option 220, the record option 224, the search frequency option 226, the search duration option 228, and the associated text boxes 214, 218 and 222, or a combination thereof, may be grouped together to enable a user to select a notification type for notifying the user of the upcoming media content of interest and specify a performance of one or more actions related to the upcoming media content of interest. Explanation language (e.g., "Specify action to take when program is upcoming") may be placed near the e-mail notification option 212, the text message notification option 216, the application notification option 220, the record option 224, the search frequency option 226, the search duration option 228, the associated text boxes 214, 218 and 222, or a combination thereof; to help guide the user.

The user may select to be notified by e-mail messages by selecting the e-mail notification option 212 and entering an e-mail address in the associated text box 214. The user may select to be notified by text messages by selecting the text message notification option 216 and entering a phone number in the associated text box 218. When the user does not provide a communication address in the associated text box 214 or in the associated text box 218 while the e-mail notification option 212 or the text message notification option 216 is selected, a default communication address (e.g., entered previously by the user and stored in the user settings 132) may be used to notify the user.

The user may select to be notified by application alerts (data pushed to a notification application of a smart phone or other computing device) by selecting the application notification option 220 and entering user identification information related to the application in the associated text box 222. The notification application may be an application developed by a media service provider to enable the user to receive media content notification. The notification application may be associated with the user account and may be programmed to communicate with the notification and scheduling server 102. The notification and scheduling server 102 may have an internal database of each notification application associated with a corresponding user account. The notification and scheduling server 102 may identify each notification application by a user supplied credential or identification (e.g., username and/or password). In a particular embodiment, one or more options and associated text boxes in the search configuration display 202 are pre-populated with default information supplied by the user and retrieved from the user settings 132. The user may enter different information by deleting or modifying the pre-populated information via the input device 109.

The user may specify that the upcoming media content of interest is to be recorded by selecting the record option 224. The user may specify the search frequency by entering a number (e.g., 7 may correspond to a search every seven days) in the search frequency option 226. The user may specify the search duration by entering a number corresponding to how far into the future media content is to be searched (e.g., 3 may correspond to media content is to be searched for the next three days, 7 may correspond to media content is to be searched for the next seven days, etc.) in the search duration option 228. When the user completes filling out the search configuration display 202, the user may select the save option 230. In response to the user selecting the save option 230, the media device 104 of FIG. 1 may then send the search criteria 146 to the notification and scheduling server 102. The user may start over by selecting the cancel option 232. The user may input information in the search configuration display 202 via the input device 109. The entered information may be stored as a file in a machine-readable and/or human-readable format (e.g., extensible markup language (XML) format. The file may be sent to the notification and scheduling server 102 as the search criteria 146.

Figure 3:
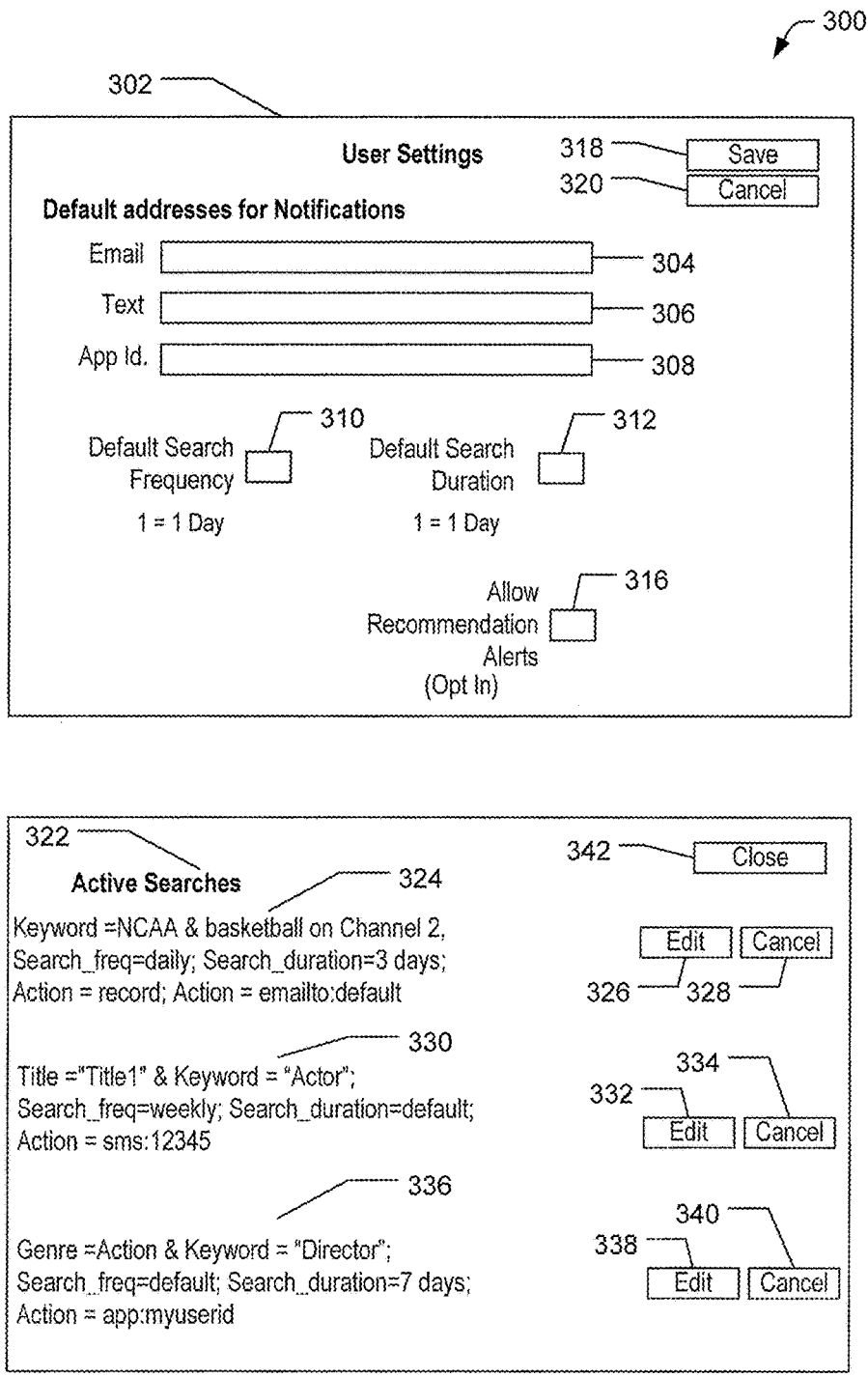
FIG. 3 is a diagram to illustrate a particular example of a user settings display and an active searches display associated with notifying a user of upcoming media content of interest.

FIG. 3 is a diagram to illustrate a particular example of a user settings display 302 and an active searches display 322 associated with notifying a user of upcoming media content of interest, and is generally designated 300.

The user settings display 302 may enable the user to specify default options related to communication address, search frequency, search duration, search timeframe, recommendation alert, or a combination thereof. The user settings display 302 may include a default e-mail address option 304, a default text message option 306, a default application identification option 308, a default search frequency option 310, a default search duration option 312, a recommendation alert option 316, a save option 318, and a cancel option 320.

The user may enter a communication address for receiving e-mails (e.g., user@abcd.com) in the default e-mail address option 304. The user may enter a phone number for receiving text messages in the default text message option 306. The user may enter application identification information (e.g., username/password) for accessing applications (e.g., an application on a mobile phone or other computing device) in the default application identification option 308. The information in the default e-mail address option 304, the default text message option 306, the default application identification option 308, or a combination thereof, may be used to notify the user of upcoming media content of interest when the user does not supply a communication address in the search configuration display 202.

The user may enter a number corresponding to a unit of time (e.g., hours, days, weeks, months, etc.) in the default search frequency option 310 to specify how often a search based on the search criteria 146 is to be performed. In a particular embodiment, entering "7" in the default search frequency option 310 denotes a search to be performed every seven days. The user may enter a number or a description corresponding to a unit of time in the default search duration option 312 to specify how far into the future searches based on the search criteria 146 are to be performed according to the search frequency. In a particular embodiment, entering "7" in the default search duration option 312 indicates that searches based on the search criteria 146 are to be performed for the next seven days according to the search frequency. The user may select the recommendation alert option 316 (e.g., by selecting the recommendation alert option 316 to display a check mark) to enable the notification module 120 of FIG. 1 to notify the user of upcoming media content of interest from search results based on search criteria automatically generated based on the user history 134.

When the user finishes specifying the different options in the user settings display 302, the user may select the save option 318. When the user selects the save option 318, the information entered by the user in the user settings display 302 may be transmitted from the media device 104 of FIG. 1 to the notification and scheduling server 102 for storage in the user settings 132. The user may select the cancel option 320 to start over. The user settings display 302 and each of the options and boxes may be provided as selectable interface elements. The user may enter such information in the user settings display 302 via the input device 109.

The active searches display 322 may provide a list of active search criteria to the user. The active searches display 322 may be generated by the notification and scheduling server 102 of FIG. 1 based on the user settings 132 and the stored searches 130. In the embodiment of FIG. 3, the active searches display 322 includes first active search 324, an associated edit option 326, an associated cancel option 328, a second active search 330, an associated edit option 332, an associated cancel option 334, a third active search 336, an associated edit option 338, an associated cancel option 340, and a close option 342. For example, the user has specified the first active search 324 to search for basketball on Channel 2 on a daily basis, where each search is to be performed for media content that is available and accessible to the user account for the next three days. The user has further specified that the media device 104 is to record media content that satisfies the search criteria and the user is to be notified via e-mail messages sent to a default e-mail address.

The user may modify or edit the first active search 324, the second active search 330, and/or the third active search 336 by selecting the associated edit options 326, 332, and/or 338, respectively. The user may remove the first active search 324, the second active search 330, and/or the third active search 336 from being searched by selecting the associated cancel options 328, 334, and/or 340, respectively.

Figure 4:
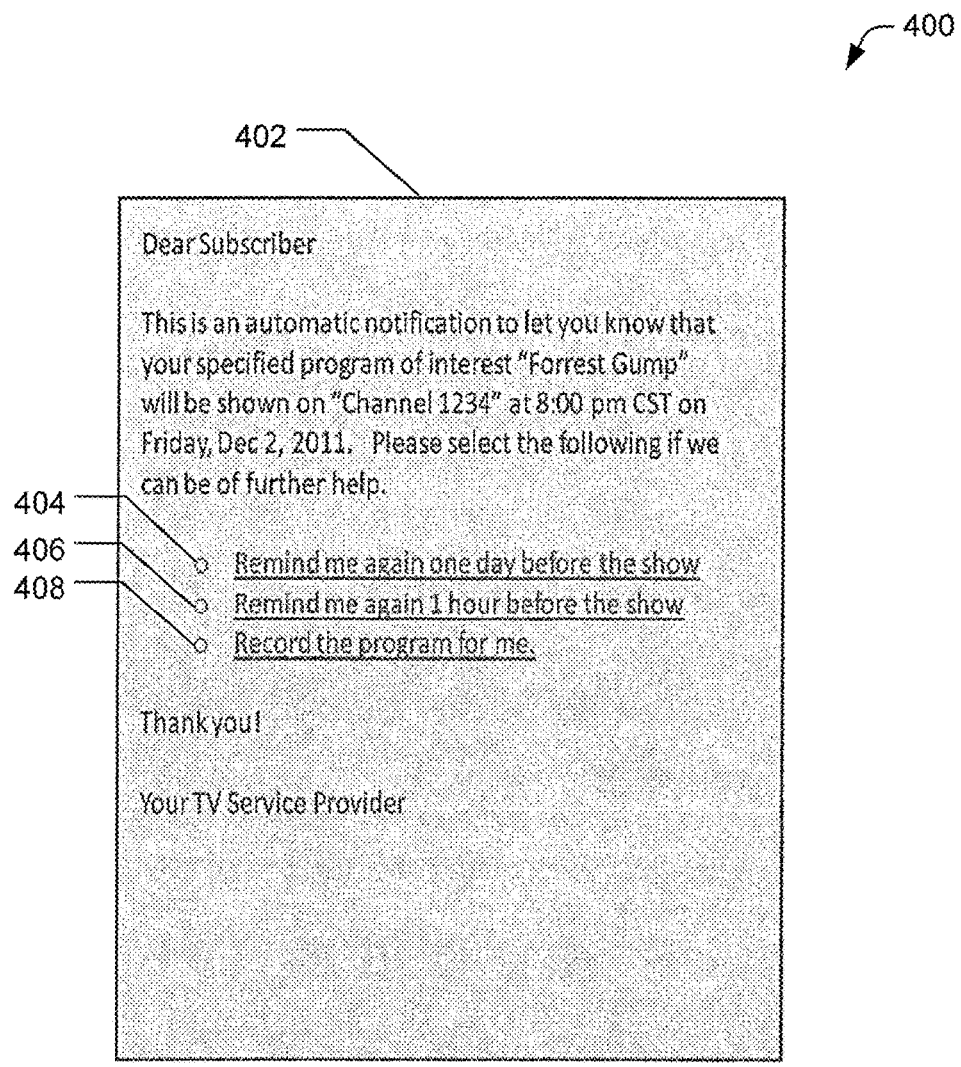
FIG. 4 is a diagram to illustrate a particular example of a notification message associated with notifying a user of upcoming media content of interest.

FIG. 4 is a diagram to illustrate a particular example of a notification message 402 to notify a user of upcoming media content of interest and is generally designated 400. In a particular embodiment, the notification message 402 is the first notification 150 of FIG. 1. In another particular embodiment, the notification message 402 is the second notification 160 of FIG. 1.

The notification message 402 may include information descriptive of particular media content that satisfies the search criteria 146 of FIG. 1, such as title information, channel information, show time information, etc. The notification message 402 may also include selectable options to specify an action that is to be performed, such as a first option 404, a second option 406, and a third option 408. In a particular embodiment, the first option 404 is an option to enable the user to schedule a reminder notification (e.g., the reminder notification 152 of FIG. 1) to be sent to a communication address (e.g., an e-mail address, a phone number of a smart phone, an application of a device such as the mobile communication device 110 of FIG. 1 and/or the computing device 112 of FIG. 1) one day before the particular media content is to be aired. The second option 406 is an option to enable the user to schedule a reminder notification to be sent to the communication address or a different communication address one hour before the particular media content is to be aired. The third option 408 is an option to schedule a recording of the particular media content.

Each of the first option 404, the second option 406, and the third option 408 may be provided by the notification and scheduling server 102 of FIG. 1 via the media device 104, the communication device 110, the computing device 112 of FIG. 1, another computing device (e.g., a tablet computer), or a combination thereof, to the user as selectable interface elements. The user may select multiple options in the notification message 402. When the user selects an option, the user may specify additional detail related to the option (e.g., a communication address to receive further notifications). The user may enter such information via an input of a device that received the notification message 402 (e.g., the mobile communication device 110, the computing device 112 of FIG. 1, or a combination thereof).

In response to receiving a user selection regarding the notification message 402, the device that received the notification message 402 (e.g., the mobile communication device 110, the computing device 112 of FIG. 1, or a combination thereof) may transmit the user selection as the reply 154 to the notification and scheduling server 102. In response to receiving the reply 154, the notification and scheduling server 102 may schedule performance of one or more actions according to the reply 154 (e.g., send out reminder notifications, schedule recording of the particular media content, etc.).

Figure 5:
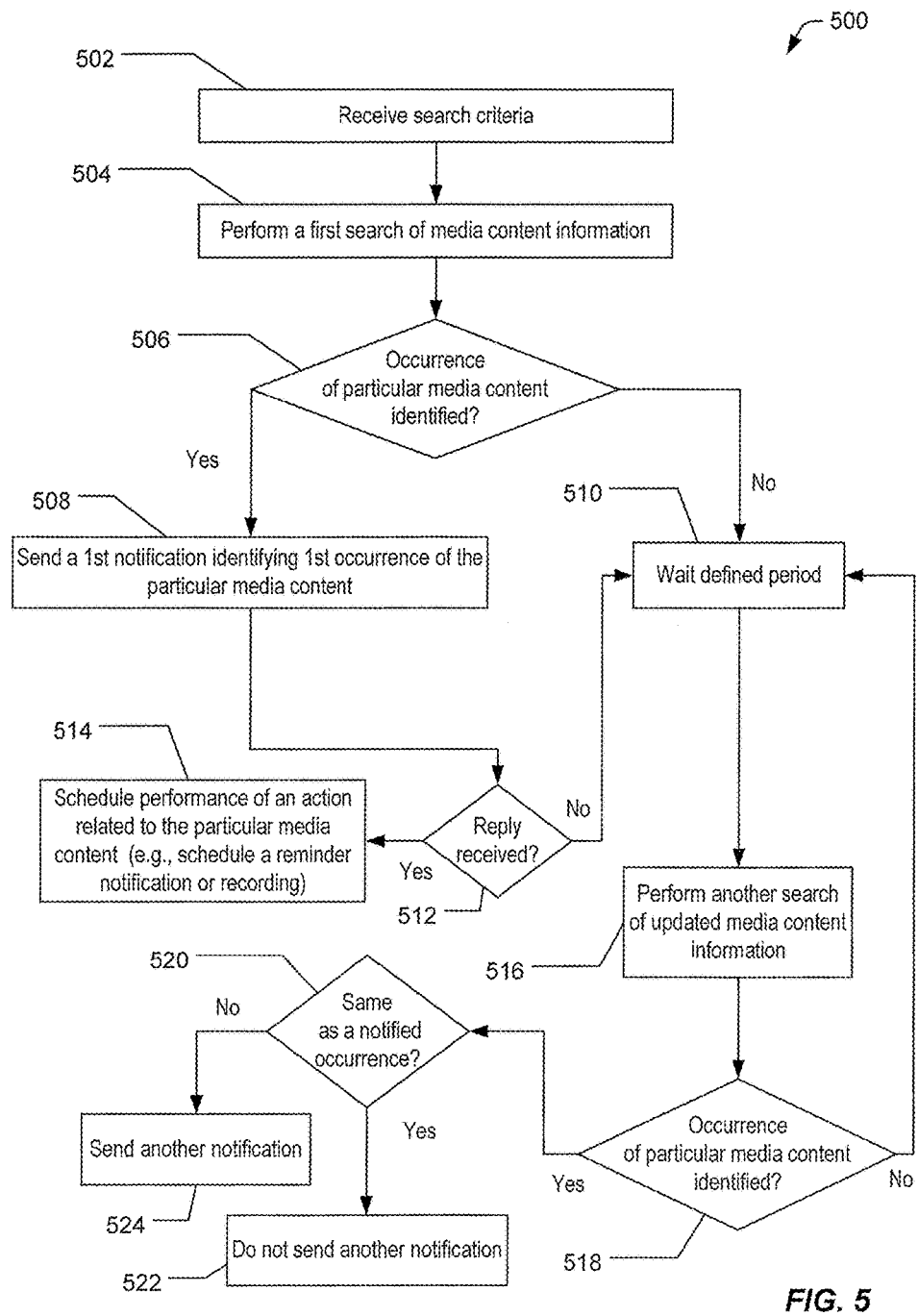
FIG. 5 is a flowchart to illustrate a particular embodiment of a method of operation at the system of FIG. 1.

FIG. 5 is a flowchart to illustrate a particular embodiment of a method 500 of operation at the system 100 of FIG. 1. The method 500 may include receiving search criteria from a media device associated with a user account, at 502. For example, in FIG. 1, the notification and scheduling server 102 may receive the search criteria 146 from the user.

The method 500 may also include performing a first search of media content information in response to receiving the search criteria, at 504. For example, in FIG. 1, in response to receiving the search criteria 146, the search engine 118 may perform the first search of media content information in the EPG data 128 based on the search criteria 146.

The method 500 may further include determining whether an occurrence of particular media content is identified, at 506. For example, in FIG. 1, the search engine 118 may determine whether an occurrence of the particular media content is identified. When an occurrence of the particular media content is identified, the method 500 may include, in response to identifying particular media content that satisfies the search criteria, sending a first notification identifying a first occurrence of the particular media content to a device associated with the user account, at 508. For example, in FIG. 1, the notification and scheduling server 102 may send the first notification 150 identifying the first occurrence of the particular media content to a user device identified by the communication address indicated in the search criteria 146. When the occurrence of the particular media content is not identified, the method 500 may include waiting for a defined time period (e.g., twenty-four hours), at 510. For example, in FIG. 1, the search engine 118 may wait for the defined time period (during which the EPG data 128 may be updated once again) before performing another search of media content information.

The method 500 may further include determining, after sending the first notification, whether a reply message indicating an action related to the particular media content that is to be performed is received, at 512. For example, in FIG. 1, the notification and scheduling server 102 may determine whether the reply 154 is received. When the reply message is received, the method 500 may include scheduling performance of one or more actions related to the particular media content, at 514. For example, in FIG. 1, the scheduler 122 may schedule performance of the one or more actions indicated by the reply 154. When the reply message is not received, the method 500 may include waiting for the defined time period, at 510. For example, in FIG. 1, the search engine 118 may wait for the defined time period as indicated in the search criteria 146.

The method 500 may further include performing another search of updated media content information, at 516. For example, in FIG. 1, the search engine 118 may perform another search for updated media content information using the updated EPG data 158. The method 500 may further include determining whether an occurrence of particular media content is identified, at 518. For example, in FIG. 1, the search engine 118 may determine whether a second occurrence of the particular media content is identified. When the occurrence of the particular media content is identified, the method 500 may include determining whether the occurrence is the same as a notified occurrence, at 520. For example, in FIG. 1, the comparison module 124 may compare the second occurrence to all previous occurrences of which the user was notified.

When the occurrence of the particular media content is the same as a notified occurrence, the method 500 may include refraining sending another notification, at 522. For example, in FIG. 1, when the comparison module 124 determines that the second occurrence is the same as the first occurrence or another notified occurrence, the comparison module 124 may instruct the notification module 120 not to send another notification. When the occurrence of the particular media content is not the same as the notified occurrence, the method 500 may include sending another notification, at 524. For example, in FIG. 1, when the comparison module 124 determines that the second occurrence is different from the first occurrence and other notified occurrences, the comparison module 124 may instruct the notification module 120 to send the second notification 160. In another example, in FIG. 1, the search engine 118 identifies the first occurrence of the particular media content that satisfies the search criteria 146 after performing another search of the updated media content information, because the occurrence of the particular media content is not identified when the search engine 118 performed the first search, the notification and scheduling server 102 may send the first notification 150.

Figure 6:
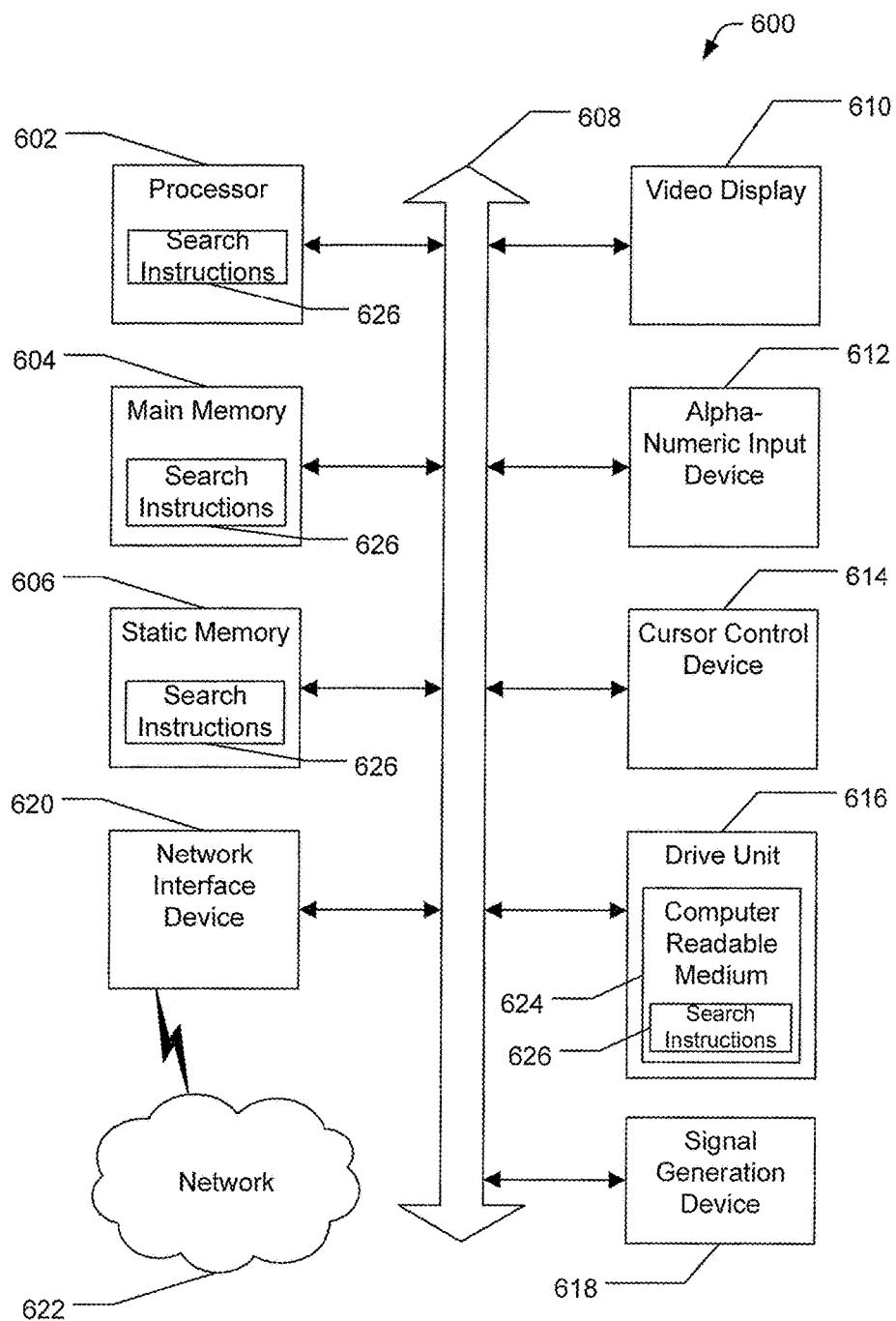
FIG. 6 is a computer system operable to support embodiments of computer-implemented methods, computer program products, and system components as illustrated in FIGS. 1-5.

FIG. 6 is a computer system 600 operable to support embodiments of computer-implemented methods, computer program products, and system components as illustrated in FIGS. 1-5. For example, the computer system 600 may include or be included within any one or more of the notification and scheduling server 102, the media device 104, the mobile communication device 110, the computing device 112 of FIG. 1, or a combination thereof.

The computer system 600 may include a processor 602, e.g., a central processing unit (CPU). Moreover, the computer system 600 may include a main memory 604 and a static memory 606 that can communicate with each other via a bus 608. As shown, the computer system 600 may further include or be coupled to a video display unit 610, a flat panel display, a solid-state display, or a projection display. For example, the video display unit 610 may be an HD television or monitor. Additionally, the computer system 600 may include an input device 612, such as a keyboard, a remote control device, and a cursor control device 614, such as a mouse. In a particular embodiment, the cursor control device 614 may be incorporated into a remote control device such as a television or set-top box remote control device. The computer system 600 may also include a disk drive unit 616, a signal generation device 618, such as a speaker or remote control device, and a network interface device 620. The network interface device 620 may be coupled to other devices (not shown) via a network 622.

In a particular embodiment, as depicted in FIG. 6, the disk drive unit 616 may include a non-transitory computer-readable medium 624 in which one or more sets of search instructions 626, e.g. software, may be embedded. Further, the search instructions 626 may embody one or more of the methods or logic as described herein, such as the method 500 of FIG. 5. In a particular embodiment, the search instructions 626 may reside completely, or at least partially, within the main memory 604, the static memory 606, and/or within the processor 602 during execution by the computer system 600. The main memory 604 and the processor 602 also may include (e.g., on-board) computer-readable non-transitory media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates the computer-readable non-transitory medium 624 that includes instructions so that a device connected to a network 622 can communicate audio, video, or data over the network 622. Further, such instructions may be transmitted or received over the network 622 via the network interface device 620.

While the computer-readable non-transitory medium 624 is shown to be a single medium, the term "computer-readable medium" includes a single medium or multiple media, such as a centralized or distributed database, and/or associated caches and servers that store one or more sets of instructions. The term "computer-readable non-transitory medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium 624 can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g. TCP/IP, UDP/IP, SIP, TR-069, WEP, Wi-Fi and HTTP) and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a server, search criteria associated with a user account, the search criteria received from a media device associated with the user account;
storing, at the server, the search criteria as stored search criteria;
performing, by the server, a search of first media content information based on the stored search criteria, the search being performed a predetermined period of time after receiving the search criteria;
sending, from the server, a first notification message to a device associated with the user account in response to identifying a first media content item that satisfies the stored search criteria and that is scheduled to be available to the media device at a first time, wherein the first notification message is configured to cause the device to display, at a display device, first identification information of the first media content item and a first plurality of selectable options including a first selectable option to send a reminder for the first media content item at a particular time before the first time, and wherein the device and the display device are distinct from the media device; and
sending a second notification message from the server to the device in response to lapse of a time period and in response to determinations that a first title associated with the first media content item matches a second title associated with a second media content item and that the first time does not match a second time of scheduled availability of the second media content item, wherein the second media content item satisfies the stored search criteria, and wherein the second notification message is configured to cause the device to display, at the display device, second identification information of the second media content item and a second plurality of selectable options.

2. The method of claim 1, wherein the first identification information includes the first title and a scheduled time and date for presentation of the first media content item.

3. The method of claim 1, further comprising, after sending the first notification message, receiving a reply message indicating selection of one option from the first plurality of selectable options.

4. The method of claim 1, wherein the first plurality of selectable options includes a second selectable option to record the first media content item, and wherein the second plurality of selectable options includes a third option to receive a notification before a scheduled show time of the second media content item, a fourth option to record the second media content item or both.

5. The method of claim 1, further comprising receiving additional input, responsive to selection of the first selectable option, to enable the server to send the reminder to the device.

6. The method of claim 1, further comprising receiving additional input, responsive to selection of the first selectable option, to enable the server to send the reminder to the media device.

7. The method of claim 1, wherein the device comprises a mobile device.

8. The method of claim 1, wherein the media device comprises a set-top box.

9. The method of claim 1, wherein the first media content information indicates a first set of media content items scheduled to be available to the media device.

10. The method of claim 9, further comprising, after lapse of the time period, performing a second search of second media content information based on the stored search criteria, wherein the second media content information indicates a second set of media content items scheduled to be available to the media device.

11. The method of claim 1, further comprising, in response to a determination that the first title matches the second title and that the first time matches the second time, refraining from sending the second notification message to the device.

12. The method of claim 1, wherein the search criteria indicate a search frequency, a search duration parameter, or both, and wherein the time period corresponds to an amount of time indicated by the search duration parameter or an amount of time between search operations associated with the search frequency.

13. A system comprising:
a network interface configured to receive search criteria associated with a user account, the search criteria received from a media device associated with the user account;
a memory to store search criteria as stored search criteria; and
a processor configured to:
perform a search of first media content information based on the stored search criteria, the search being performed a predetermined period of time after receiving the search criteria;
send a first notification message to a device associated with the user account in response to a determination that a first media content item satisfies the stored search criteria and is scheduled to be available to the media device at a first time, wherein the first notification message is configured to cause the device to display, at a display device, first identification information of the first media content item and a first plurality of selectable options including a first selectable option to send a reminder for the first media content item at a particular time before the first time, and wherein the media device is distinct from the device and the display device; and send a second notification message to the device in response to lapse of a time period and in response to determinations that a first title associated with the first media content item matches a second title associated with a second media content item and that the first time does not match a second time of scheduled availability of the second media content item, wherein the second media content item satisfies the stored search criteria, and wherein the second notification message is configured to cause the device to display, at the display device, second identification information of the second media content item and a second plurality of selectable options.

14. The system of claim 13, wherein the first plurality of selectable options includes a second selectable option to record the first media content item.

15. The system of claim 13, wherein the second plurality of selectable options includes a first particular selectable option to receive a notification before the second time, a second particular second selectable option to record the second media content item, or both.

16. The system of claim 13, wherein the processor is further configured to perform a second search of second media content information associated with second media content that is scheduled to be available to the media device after lapse of the time period based on the stored search criteria, wherein the second search identifies the second media content item.

17. The system of claim 13, wherein the first identification information includes the first title, a scheduled time and data for presentation of the first media content item.

18. A computer-readable storage device storing instructions that, when executed by a processor, cause the processor to perform operations comprising:
   receiving search criteria associated with a user account, the search criteria received from a media device associated with the user account;
   storing the search criteria as stored search criteria;
   performing a search of first media content information based on the stored search criteria, the search being performed a predetermined period of time after receiving the search criteria;
   causing a first notification message to be sent to a device associated with the user account in response to a determination that a first media content item satisfies the stored search criteria and is scheduled to be available to the media device at a first time, wherein the first notification message is configured to cause the device to display, at a display device, first identification information of the first media content item and a first plurality of selectable options including a first selectable option to record the first media content item, and wherein the media device is distinct from the device and the display device; and
   causing a second notification message to be sent to the device in response to lapse of a time period and in response to a determination that a second media content item satisfies the stored search criteria and is scheduled to be available to the media device, wherein the second notification message is configured to cause the device to display, at the display device, second identification information of the second media content item and a second plurality of selectable options to be displayed to the display device.

19. The computer-readable storage device of claim 18, wherein the second notification message is sent to the device in response to a determination that a first title associated with the first media content item and a second title associated with the second media content item match and a determination that a first time associated with the first media content item and a second time associated with the second media content item do not match.

20. The computer-readable storage device of claim 18, wherein the first plurality of selectable options includes a second selectable option to send a reminder for the first media content item at a particular time before the first time.

* * * * *